(12) United States Patent
Brothers

(10) Patent No.: US 7,035,817 B1
(45) Date of Patent: Apr. 25, 2006

(54) ELECTRONIC CATALOG METHOD

(75) Inventor: Laurence R. Brothers, Waltham, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/350,952

(22) Filed: Jul. 9, 1999

(51) Int. Cl.
*G06F 17/60* (2006.01)

(52) U.S. Cl. ........................................................ 705/27

(58) Field of Classification Search .................. 705/26, 705/27, 51, 53, 57, 80; 700/83, 17, 24–25; 709/226; 382/137
See application file for complete search history.

(56) References Cited

U.S. PATENT DOCUMENTS

| | | | | |
|---|---|---|---|---|
| 5,903,652 | A | * | 5/1999 | Mital ........................... 705/78 |
| 5,918,213 | A | * | 6/1999 | Bernard et al. ............... 705/26 |
| 5,950,173 | A | * | 9/1999 | Perkowski .................... 705/26 |
| 5,970,475 | A | * | 10/1999 | Barnes et al. ................. 705/27 |
| 6,038,601 | A | * | 3/2000 | Lambert et al. ............. 709/226 |
| 6,072,481 | A | * | 6/2000 | Matsushita et al. ......... 707/102 |
| 6,226,675 | B1 | * | 5/2001 | Meltzer et al. ............... 705/26 |
| 6,269,446 | B1 | * | 7/2001 | Schumacher et al. ....... 713/176 |
| 6,321,334 | B1 | * | 11/2001 | Jerger et al. ................. 713/200 |
| 6,345,361 | B1 | * | 2/2002 | Jerger et al. ................. 713/200 |
| 6,473,800 | B1 | * | 10/2002 | Jerger et al. ................. 709/226 |
| 6,490,367 | B1 | * | 12/2002 | Carlsson et al. ............. 382/137 |
| 6,519,571 | B1 | * | 2/2003 | Guheen et al. ............... 705/14 |

OTHER PUBLICATIONS

Mike Heck, Eliminate Web publishing bottlenecks . . . , InforWorld, Aug. 7, 2000, from http://www.findarticles.com.*
Unknown, Diamond Head's tempest server version 2.1 to be used to store over twenty million images, Business Wire, Mar. 1, 1999, 3 pages.*
Darlene Fichter, Building Web sites using dynamic templating, Online, Nov. 2000, 5 pages.*
Mike Heck, Eliminate Web publishing bottlenecks—Documentum 4i eBusiness puts updates in the . . . , InfoWorld, Aug. 7, 2000, 3 pages.*
Mike Heck, Organize files on your Internet or Intranet server for distribution, InfoWorld, Jan. 12, 1998, 2 pages.*
Darlene Fichter, Delivering the Goods: Intranet database for small and large projects, Online, May 2000, 4 pages.*
CommerceNet "Catalog Interoperability Pilot," http://www.commerce.net/projects/currentprojects/eco/.
CommerceNet "eCo Framework Project": http://www.commerce.net/projects/currentprojects/eco/.

* cited by examiner

*Primary Examiner*—Jeffrey A. Smith
*Assistant Examiner*—Patricia Lewis
(74) *Attorney, Agent, or Firm*—Leonard C. Suchyta, Esq.; Joseph R. Palmieri, Esq.; Joel Wall, Esq.

(57) ABSTRACT

Disclosed herein is an electronic catalog protocol format and process for distributing and disseminating electronic catalogs. The electronic catalog protocol can be used on the Internet and other networks and in physical media such as CD-ROMs.

20 Claims, 7 Drawing Sheets

ELECTRONIC CATALOG METHOD

BACKGROUND OF THE INVENTION

1. Field of the Invention

This invention generally relates to electronic commerce, and more particularly to methods and systems for offering goods and services via catalogs.

2. Description of Related Art

Computer networks offer geographically distributed users unprecedented opportunities to interact with each other. One widely used network is the Internet. The Internet includes a system of interconnected computers and computer networks operatively forming a single world wide network. A user, through the Internet, can interactively transmit messages with users in different locations. Similarly, a user in one location can connect to files and libraries in other locations. Thus, the Internet provides versatile communications functions and acts like a library, providing electronic access to resources and information available from Internet sites throughout the world. Access to the Internet can be had from a wide range of locations and through a wide range of devices. For example, a user with a laptop computer and a modem may connect to the Internet through a telephone jack. Wireless Internet connections are also available.

Electronic commerce has emerged as an important use of the Internet. The Internet is used to assist buyers and sellers in purchasing or selling a variety of goods and services. Methods of purchasing and selling cryptographic systems and methods have been developed at least in part for assuring authenticity of a signer of a transaction, electronic payment systems, and electronic auction systems and methods. Electronic commerce Internet sites typically allow remotely distributed users to interact via an Internet site, through which the users may execute traditional commercial transactions online. Thus, the Internet typically offers convenience, but does not significantly alter the underlying transaction contexts.

The Internet and the World-Wide Web are means by which merchant server software systems communicate catalog information to consumers or other prospective purchasers of information, goods and services. Consumers use web-browsers with HTTP and related protocols to browse, navigate, or search on-line product catalogs as presented by merchant servers. merchant servers transmit relatively unstructured HTML (with other accompanying media formats) to a general purpose web-browser, and support various payment and security protocols to enable credit card authorization and order-taking.

Business-to-business transactions generally take place via electronic data interchange ("EDI") purchase orders, invoices, and other standard forms, which are usually only readily communicable between enterprises which have previously agreed on one or more EDI forms and formats to be used, and which have previously negotiated terms of sale, payment, and delivery. While EDI can be used to transmit some types of catalog information, it is usually used for transaction-processing, as prior agreements generally required for EDI's use make it possible to send catalogs between business partners in other more efficient ways. EDI has historically been conveyed either through direct communication between business partners over phone lines or private networks, or through VANs (Value Added Networks) which provide a variety of secretarial and administrative services and conveniences for their subscribers. Of late a growing quantity of EDI documents are transmitted across the Internet. Internet use does not, however, in and of itself change the basic nature of EDI document interchange, though it may make it easier for business partners, especially small businesses, to accommodate one another in sharing a common telecommunication infrastructure. In addition, protocols and standards such as OBI (Open Buying on the Internet) are helping to make Internet-based business-to-business commerce easier and more effective as regards transaction and payment processing; but these efforts too do not address catalog publication and distribution.

In neither case described above, (neither business-to-consumer nor business-to-business) is there any common format for publishable machine-readable catalog data. Accordingly, HTML transmitted by merchant servers to consumers is intended for human viewing, not for automated semantic analysis at any level higher than elementary display and I/O functions performed by a web-browser. It is of course often possible to parse HTML for purposes of data-extraction, but this can be a difficult task, and in any event is not a desirable method of sending catalog data between systems or applications. Furthermore, a data-extraction method must be implemented on a per-store or per-merchant-server basis; the same data-extraction method cannot be directly applied to merchant servers or Internet stores in general.

Some efforts have been made to provide for electronic catalogs. An effort known as the Catalog Interoperability Pilot is devoted to enabling catalog interoperability for U.S. government applications across departments and vendors. Catalogs of the Catalog Interoperability Pilot have digital signatures.

The CommerceNet eCo Framework Project attempts to integrate a very wide variety of e-commerce standards and incorporates a "common business language" (CBL). The CBL is used for active business directives and is not used for catalog content.

Referring to FIGS. 4 and 5, prior art systems and methods are depicted. In FIG. 4, a customer 300 using a client machine 301 with a web-browser 302 "visits", via a network 312, such as the Internet, a web site 304 supported by a merchant server 308 web site and views an on-line catalog 310. Customer 300 interactively chooses purchases and makes a payment using web-browser 302. Aspects of this transaction are managed by merchant server 308, and an active connection to an on-line merchant server 308 is used for this transaction to occur. merchant server 308 may interact with a database 314, which may store the catalog in a relational database format, for example.

Referring to FIG. 5, a prior art system in which a purchaser with a purchasing system 400 generates a purchase order 402 and uses an EDI translator 404 to send the EDI purchase order 402 to a vendor with a vendor system 406 (the form may be sent off-line or asynchronously through a VAN 408) is depicted. The vendor system 406 later generates an invoice 410 which is then generated by an EDI translator 412 into an EDI invoice form and sent to the purchasing system 400, such as via the VAN or private line 408. Other forms may also be employed. In many or most cases an on-line or electronic catalog may not exist, and in any event will probably not be involved in the transaction. It is up to the purchaser and seller (and their back-office systems) to jointly assure that SKUs or other product identifiers and prices are appropriate and correct. EDI does not manage that part of the transaction.

A number of specific drawbacks exist with current methods and systems. For example, in the case of distribution of portions of documents, URL links are a feature of general HTML documents, but HTML is not a suitable format for automatically parseable electronic catalogs. Furthermore, for images and similar multimedia content, HTML does not provide in-line document data, but absolutely requires links. The MIME compound multimedia format, on the other hand, requires in-line document data for all its multimedia parts, and does not permit links.

Another drawback is with existing software systems. While many catalogs are published and disseminated on-line and off-line, and at least one such format is digitally signed, standard software whose purpose is to verify validity of catalogs does not exist for other catalog formats.

Document annotation systems exist, but none provide structured, sourced and signed annotations for publishable commercial catalogs.

Another problem with the prior art is that ordinary merchant server catalogs cannot be conveniently stored in a central repository. While other catalogs issued by various vendors can certainly be stored locally be clients, they cannot be stored in the same repository since they do not share a common format or semantic interpretation of their fields.

Accordingly, a need exists for a standard, flexible format for publishing catalogs and catalog objects electronically.

SUMMARY OF THE INVENTION

Systems and methods disclosed herein use mark-up languages, URLs and digital signature technology to provide a standard format for publishing catalogs and catalog objects electronically.

Systems and methods disclosed herein include a document for an electronic catalog protocol. The document may include a first portion having at least one method information selected from ordering method information and payment method information, a second portion, having at least one entry selected from an offer to sell and an offer to buy and a third portion having security information configured with the selected entry and method information. Distribution may be to a plurality of servers.

Also provided herein is a computer program for verifying authenticity of an electronic catalog, including a document type definition for an electronic catalog, including a header, a footer, and a body, wherein the document type definition permits distribution of elements of an electronic catalog document, a digital signature included in the footer of the electronic catalog and signature verification software for verifying the authenticity of the electronic catalog.

Also disclosed is a computer program for updating an electronic catalog, including a document type definition for an electronic catalog, including a header, a footer, and a body, wherein the document type definition permits distribution of elements of an electronic catalog document, a parser for reading the elements of the electronic catalog and update software for updating the elements of the electronic catalog according to results obtained from the parser.

Also disclosed is a computer program for annotation of an electronic catalog, including a document type definition for an electronic catalog, including a header, a footer, and a body, wherein the document type definition permits distribution of elements of an electronic catalog document, at least one electronic catalog source document according to the document type definition and at least one compound document according to the document type definition, wherein the compound document encloses the electronic catalog source document and includes annotation sections which refer to entries in the electronic catalog source document. The computer program may further include a digital signature for verification of the compound document, wherein verification of the compound document does not prevent verification of the authenticity of the electronic catalog source document.

Also disclosed is a computer program for assisting purchases and sales of a plurality of items according to a plurality of transaction types, including a document type definition for an electronic catalog, including a header, a footer, and a body, wherein the document type definition permits distribution of elements of an electronic catalog document and a sales-model tag included in the header, for specifying the type of transaction for which the electronic catalog will be used. The sales-model tag may support at least one of one-to-one, many-to-one and one-to-many sales models.

Also disclosed is a computer-based repository for electronic catalog documents, including a document type definition for an electronic catalog, including a header, a footer, and a body, wherein the document type definition permits distribution of elements of an electronic catalog document, a location in memory of a computer for storing electronic catalog documents that are established according to the document type definition and database software for storing electronic catalog documents in memory and for retrieving electronic catalog documents from memory.

Also disclosed is a computer-based method of providing an electronic catalog, including providing a document type definition for an electronic catalog, including a header, a footer and a body, wherein the document type definition permits distribution of elements of an electronic catalog document. The method may further include distributing elements of an electronic catalog document to a plurality of servers.

Also disclosed is a computer-based method for verifying the authenticity of an electronic catalog, including establishing a document type definition for an electronic catalog document, including a header, a footer, and a body, wherein the document type definition permits distribution of elements of an electronic catalog document, including a digital signature in the footer of the electronic catalog and providing verification software for verifying the authenticity of the electronic catalog document.

Also disclosed is a computer-based method for updating an electronic catalog, including steps of establishing a document type definition for an electronic catalog document, including a header, a footer, and a body, wherein the document type definition permits distribution of elements of an electronic catalog document, providing a parser for reading the elements of the electronic catalog and providing update software for updating the electronic catalog document according to output from the parser. The elements of the electronic catalog document may include time-stamps, wherein the parser reads the time-stamps, and wherein the update software deletes expired elements of the electronic catalog document based on the time-stamps. The elements of an electronic catalog document may also include an indication whether the elements have been modified, wherein the parser reads the indication, and the update software may produce a modified electronic catalog document based on the output from the parser.

Also disclosed is a computer-based method for annotation of an electronic catalog. The method may include establishing a document type definition for an electronic catalog, including a header, a footer, and a body, wherein the document type definition permits distribution of elements of an electronic catalog document, providing at least one electronic catalog source document according to the document type definition and providing at least one compound document according to the document type definition, wherein the compound document encloses the electronic catalog source document and includes annotation sections which refer to entries in the electronic catalog source document.

Also disclosed is a computer-based method for assisting purchases and sales of a plurality of items according to a plurality of transaction types. The method may include establishing a document type definition for an electronic catalog, including a header, a footer, and a body, wherein the document type definition permits distribution of elements of an electronic catalog document and providing a sales-model tag included in the header, for specifying the type of transaction for which the electronic catalog will be used.

Also disclosed is a computer-based method of storing electronic documents, including stablishing a document type definition for an electronic catalog, including a header, a footer, and a body, wherein the document type definition permits distribution of elements of an electronic catalog document, providing a location in memory of a computer for storing electronic catalog documents that are established according to the document type definition and providing database software for storing electronic catalog documents in memory and for retrieving electronic catalog documents from memory.

In contrast to conventional business-to-consumer merchant server catalogs, a published catalog may be copied and redistributed freely off-line without requiring constant on-line communication with an active and accessible server. In contrast to conventional business-to-business EDI transactions, a publishable catalog format does not require prior arrangements between enterprises, nor does its distribution, transmission, or replication require a commercial transaction (with its accompanying overhead) to take place. Moreover, one or more of these features may be used without replacing or supplanting use of a merchant server or of an EDI; instead such features may supplement these useful and successful electronic commerce methods.

DETAILED DESCRIPTION OF THE PREFERRED EMBODIMENT(S)

An Electronic Catalog Protocol may include one or more languages, plus associated processes for using such languages and one or more software systems that implement these processes. An ECP document may be a catalog or a reverse catalog; it may contain information and/or references to information required to place an order to buy or sell a product, commodity, or service.

ECP language may be defined in terms of XML. An XML DTD (Document Type Definition) may thus be established for the ECP document language. Conventional use of XML for defining the ECP language is, however, a mere convenience; other language-defining languages could be used, or the ECP language could be defined "from scratch". XML's utility for ECP is, first, that its semantics are well-defined, well-known and standardized by the World-Wide Web Consortium (W3C), and, second, that tools (such as parsers) for manipulating XML are now becoming widely available and can be readily embedded in clients and servers.

A special characteristic of an ECP document in contrast to traditional product catalogs is that parts of it may be distributed in space. While certain components of any ECP document must exist in an integral form which indeed defines the document's "presence" at any location, other ECP document components can be stored elsewhere. Such distributed components are identified within ECP documents by URLs, with similar semantics to URLs found within HTML. Some distributed ECP document components such as payment protocol addresses and network ports are required to be accessible for transaction processing of an event, such as a purchase order composed of any of the catalog entries in the document; others, such as images of products that may be present only for convenience of human shoppers, and if temporarily or even permanently inaccessible do not destroy the utility of the ECP document.

Figure 1:
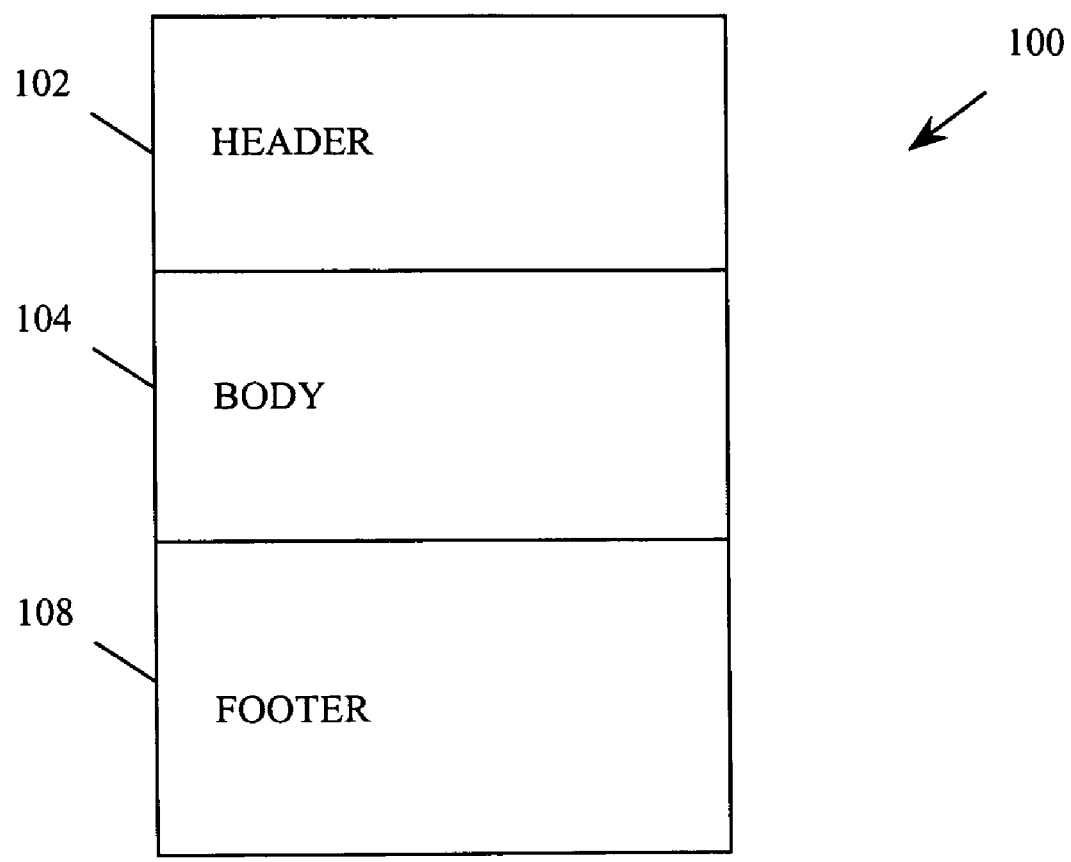
FIG. 1 depicts a structure for a document type of the present disclosure.

Referring to FIG. 1, a block diagram of an exemplary ECP document 100 is illustratively shown. ECP document 100 comprises header section 102, body section 104, and footer section 108.

Figure 2:
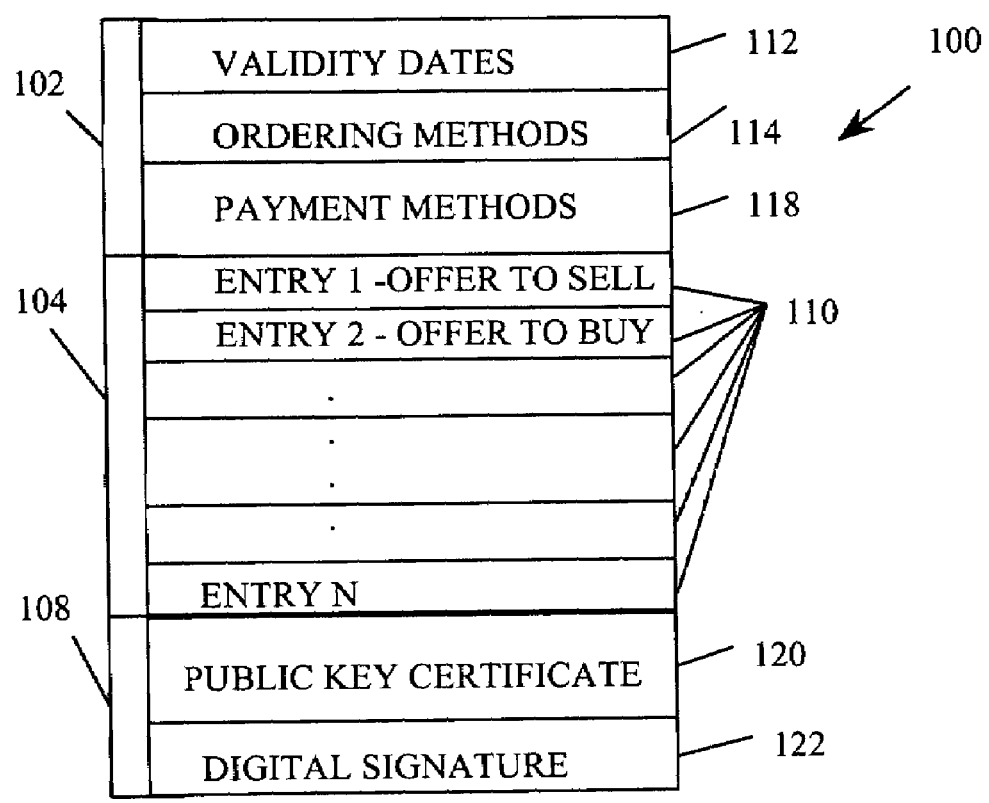
FIG. 2 depicts further detail as to the structure of a document type in an embodiment disclosed herein.

Referring to FIG. 2, further details of an exemplary ECP document 100 are illustratively shown. Header section 102 identifies a source of a catalog and gives various other general pieces of information such as validity date information 112 for this catalog, acceptable ordering method information 114 and acceptable payment method information 118. Body section 104 contains various catalog line or objects entries 110 which may represent offers to buy or to sell a particular product, service, or commodity. Footer section 108 comprises a catalog-issuer's public-key certificate 120 and digital signature 122, which may be used for verifying that header and body content is correct and that it was in fact issued by an authenticated source.

Under XML, header and footer sections 102, 108 are conventionally not "hyperlinkable"—i.e., they may not be replaced by URLs and must be an integral part of the document; however these sections 102, 108 may contain URLs such as a URL identifying a merchant-server's network address at which a purchase order and payment authorization may be accomplished.

Some elements of body section 104 are required to be conveyed in data with a document, but other sections may in any given document possibly be replaced by URLs. For example, an optional image component showing a picture of a product put up for sale may be stored on some remote server and not be carried within an associated document. Some key components of catalog objects may never be replaced by hyperlinks if they are provided at all. These non-linkable fields may include SKU or other product identification information such a manufacturer, model number, and product name, and base unit price. Such information may be modified appropriately to reflect the nature of the goods.

Since an ECP document 100 is digitally signed with digital signature 122, it can be electronically duplicated and distributed freely with little to no loss of "authenticity" or trust that a recipient might have in an original catalog issuer. Any alteration, however minute, to the content of an ECP document 100 will cause digital signature 122 to cease to apply to this document 100. Even an original publisher cannot alter or repudiate content of an ECP document 100 once it has been distributed. A signature verification process may be performed by any recipient of an ECP document 100 in conjunction with a trusted Certificate Authority which issued certificate and key pair used to create signature.

ECP documents may be used both to constitute "offers to sell," such as found in conventional catalogs, as well as "offers to buy," such as found in reverse catalogs. ECP documents 100 can be used to support a conventional "store" paradigm of shopping where individual shoppers are independent of one another, or may also be used to support "auction" or "RFQ" forms of commerce where shoppers interact to determine a final price of individual product instances; in such cases a "base unit price" of a catalog object may be replaced by a "minimum price", "maximum price", or "reserve price" or completely withheld, as appropriate to the sales model employed.

ECP documents 100 can be transmitted or published using any media, formats, and protocols by which documents in general are transmitted, including, (on the Internet) FTP, SMTP, HTTP, et al. ECP documents 100 are not constrained to exist only on the Internet, however, and may be distributed over virtually any network by other protocols, or in transportable physical media such as CD-ROMs, floppy disks, et al.

By way of example and not limitation, one particular set of ECP document 100 sections is provided herein below. Notably, claims made with respect to ECP document sections are not limited to this particular example, which is given merely as an example of an ECP language. Moreover, claims with respect to ECP are not limited to exemplary capabilities illustratively provided in this example. The "NEWCO Products" corporation given in this example is fictitious, and is not intended to represent, either directly or impliedly, any actual company.

```
<?xml version="1.0"?>
<!DOCTYPE Catalogue SYSTEM "ecp.dtd">
<Catalogue version="1.0">
<Header>
    <CatalogueIdentifier>
    <CatalogueName>NEWCO Spring 1999 Catalogue</CatalogueName>
    <CatalogueCreator>
    <Entity type="business">
        <EntityName>NEWCO Products, inc.</EntityName>
        <EntityCertificate>
<!-- This block of "x"s would in a real catalogue be replaced
    by the encoded value of the X.509 certificate of the creator
    of the catalogue.-->
<![CDATA[
XXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXX
]]>
        <EntityCertificate>
        <ContactData type="postal">1 NEWCO Way, NEWCO, AZ 00000</ContactData>
        <ContactData type="email">NEWCO@NEWCOprod.com</ContactData>
        <ContactData type="voice">(781)555-1234</ContactData>
    </Entity>
    </CatalogueCreator>
    </CatalogueIdentifier>
    <SalesModel type="conventional"/>
    <ValidityExpression type="range">
        <TimeStamp>Mon Feb 1 15:08:51 EST 1999<TimeStamp>
        <TimeStamp>Mon Jun 14 15:52:37 EDT 1999</TimeStamp>
    </ValidityExpression>
    <ResponseAddress type="http">
    http://www.NEWCOprod.com/ecp-order/
    </ResponseAddress>
</Header>
<Body>
<Item>
<ItemIdentifier>1</ItemIdentifier>
<Listing>
    <ListingName>NEWCO Rocket Sled</ListingName>
    <ListingIdentifier type="SKU">APRS23</ListingIdentifier>
        <ListingIdentifier type="manufacturer">NEWCO</ListingIdentifier>
    <Price type="unit"
        role="offer"
        specifier="exact"
```

-continued

```
            denomenation="USD">$2,999.99</Price>
        <ContentLink linkType="URL"
            contentType="image/gif"
            source="NEWCO"
                role="productImage">
    http://www.NEWCOprod.com/rr/rs.gif
        </ContentLink>
    </Listing>
</Item>
<Item>
<ItemIdentifier>2</ItemIdentifier>
<Listing>
    <ListingName>NEWCO BIRD Costume (female)</ListingName>
    <ListingIdentifier type="SKU">APRRC6f</ListingIdentifier>
    <ListingIdentifier type="manufacturer">NEWCO Products</ListingIdentifier>
        <Price type="unit"
            role="offer"
            specifier="exact"
            denomenation="USD">$400.00</Price>
        <ContentLink linkType="URL"
            contentType="text/plain"
            source="Consumer Guide"
                role="productReview">
    http://www.consumer.org/reviews/arrc.html
        </ContentLink>
    </Listing>
</Item>
</Body>
<Footer>
<DigitalSignature>
<!-- This block of "y"s would in a real catalogue be replaced
    by the encoded value of the digital signature of the header and
    the body.-->
<![CDATA[
yyyyyyyyyyyyyyyyyyyyyyyyyyyyyyyyyyyyyyyyyyyyyyyyyyyyyyyyyy
yyyyyyyyyyyyyyyyyyyyyyyyyyyyyyyyyyyyyyyyyyyyyyyyyyyyyyyyyy
yyyyyyyyyyyyyyyyyyyyyyyyyyyyyyyyyyyyyyyyyyyyyyyyyyyyyyyyyy
yyyyyyyyyyyyyyyyyyyyyyyyyyyyyyyyyyyyyyyyyyyyyyyyyyyyyyyyyy
yyyyyyyyyyyyyyyyyyyyyyyyyyyyyyyyyyyyyyyyyyyyyyyyyyyyyyyyyy
yyyyyyyyyyyyyyyyyyyyyyyyyyyyyyyyyyyyyyyyyyyyyyyyyyyyyyyyyy
yyyyyyyyyyyyyyyyyyyyyyyyyyyyyyyyyyyyyyyyyyyyyyyyyyyyyyyy
yyyyyyyyyyyyyyyyyyyyyyyyyyyyyyyyyyyyyyyyyyyyyyyyyyyyyyyy
]]>
</DigitalSignature>
</Footer>
</Catalogue>
```

Figure 3:
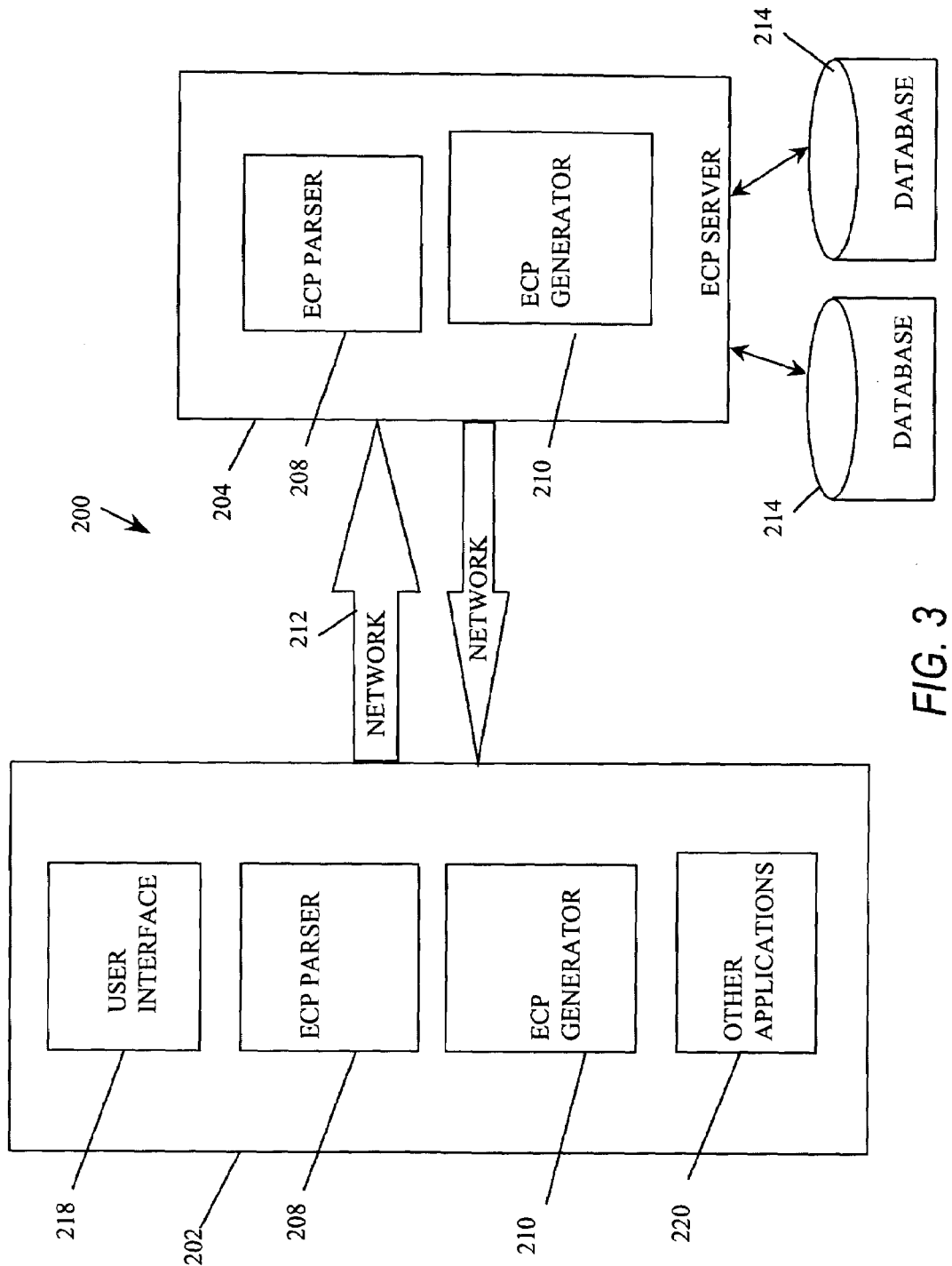
FIG. 3 depicts components for a system for enabling an electronic catalog protocol according to an embodiment of the disclosure.
Figure 4:
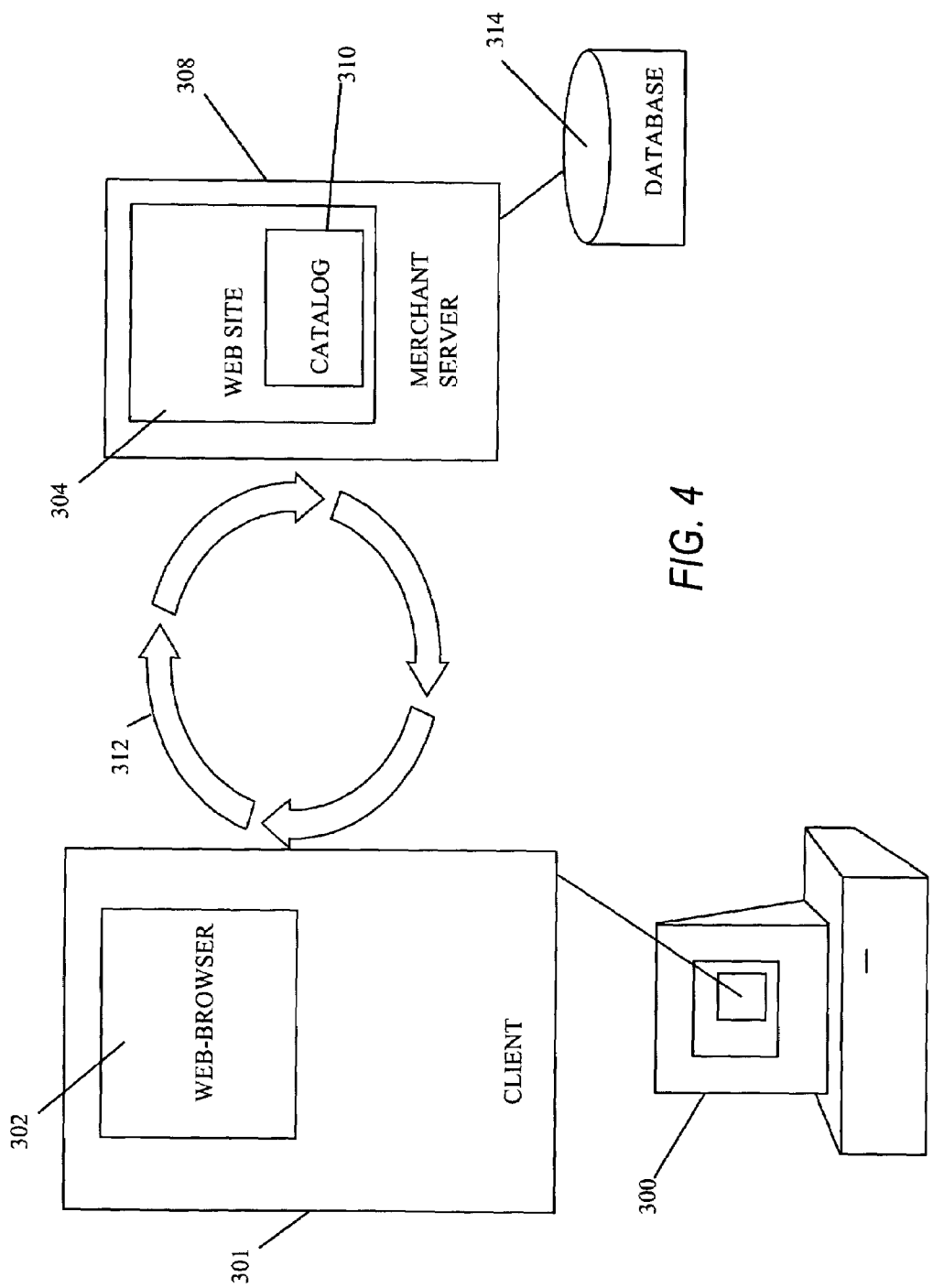
FIG. 4 depicts components for a system for enabling use of an electronic catalog in accordance with an embodiment of the present disclosure.

Referring to FIG. 3, there is shown a block diagram of an exemplary portion of a system 200 for handling one or more ECP documents 100 of FIG. 1 in accordance with an embodiment of the present disclosure. Such a system 200 may include one or more ECP clients 202 and one or more ECP servers 204. ECP clients 202 and ECP servers 204 may be connected via a network 212, such as a portion of the Internet, World Wide Web, or other connection. Also included in system 200 are one or more ECP parsers 208 and one or more ECP generators 210.

With continuing reference to FIG. 3 and renewed references to FIG. 1, ECP generators 210 may comprise software which, given appropriate input, generates ECP documents 100. ECP parsers 208 may comprise one or more software systems to read and process an ECP document 100. ECP servers 204 may service on-line and off-line requests for ECP documents 100. ECP clients 202 may include software systems capable of reading and displaying ECP documents 100 for an end-user or an end-user's application for purposes of some commercial transaction. As depicted in FIG. 3, ECP clients 202 and ECP servers 204 may, in an embodiment, include or be associated with ECP parsers 208 and ECP generators 210, but ECP parsers 208 and ECP generators 210 may exist independently of ECP clients 202 and ECP servers 204.

ECP parsers 208 read ECP documents 100 and structure one or more various internal document fields according to some model, for example according to the Document Object Model (DOM) or according to an entity-relationship model of some particular database. ECP parsers 208 may be capable of verifying an digital signature 122 in footer section 108 of an ECP document 100. Modeled internal fields of ECP document 100 may then be stored in one or more databases 214, presented to a user for action, or otherwise processed. An ECP parser 208 may be a component or plug-in of a web-browser, or it may be an independent program. An ECP parser 208 may be in part a generic XML/DOM parser such as the IBM XML4J parser, partly on a commercial security package for signature verification, or partly on custom code in a suitable web programming language.

ECP generator 210 creates ECP documents 100, usually from information stored in a database 214. Database 214 may be stored on an ECP server 204, or may be an external database. Conventionally, a merchant or commercial concern will have most or all of their data needed to create ECP documents 100 in some common relational database format. Generation of an ECP document 100 can be accomplished by a "report writer" function capability of a commercial relational database management system, which will assemble ECP header section 102 and body section 104 and transmit appropriately formatted XML. Footer section 108, with its certificate 120 and electronic signature 122, may be generated using a conventional commercial encryption package such as that provided by VeriSign, Inc.

An ECP server 204 must include an ECP generator 110, and will likely include an ECP parser 208 as well. An ECP server 204 may perform various functions either on-line (in direct communication with an ECP client 202) or off-line (indirectly, via email, FTP, or other forms of batch processing) which can enhance use of ECP catalogs. None of these functions are absolutely necessary for use of ECP catalogs, but they make ECP catalog use more effective.

Functions of an ECP server 204 may include a rating function and a discounting function. Catalog entries in body section 104 of an ECP document 100 may or may not be specified as having fixed prices, and if they do have prices, they may be specified as being present only as "suggested", "maximum", "minimum" or "provisional". In these cases, it will be necessary for a prospective purchaser to ascertain an actual price prior to concluding a purchase. Based on SKU or other catalog entry identification provided in ECP document 100, ECP server 204 can rate (establish a price for) any given item. In addition, a merchant may have various special plans available to specific customers or for specific purchases, and ECP server 204 may discount (modify a rated price for) an item as well.

ECP server 204 may also provide aggregation and de-aggregation functions. A given ECP document 100 may include a large number of catalog entries. A recipient of such a document may prefer not to store or redistribute such a large quantity of items. Alternatively, a recipient of several ECP documents 100 from a same source might wish to aggregate all catalog entries into a single document. However, digital signature 120 of an ECP document 100 might seem to prevent an ECP document 100 from being broken up for piecemeal storage or redistribution by another party, and might also prevent aggregation. Hence it is desirable for the issuer of a multi-item ECP document 100 to be able to re-sign new documents which contain either subsets of items in an existing ECP document 100, or which contain unions of subsets of items from multiple documents. A newer pared-down or built-up ECP document 100 would then be just as valid as an older one. This process requires ECP server 204 to read old ECP documents 100, verify that catalog entries in ECP documents 100 are accurate, and generate a new ECP document 100 containing the specified entries.

ECP servers 204 may also accomplish updating of ECP documents 100. Most ECP documents 100 will have limited lifetimes, as they will include a fixed time-stamp after which catalog entries in such a document are no longer warranted by an associated issuer to be accurate. However, in many cases, catalog entries in body section 104 will in fact either continue to be accurate, or will only be modified slightly, e.g. in price. A recipient of an out-of-date ECP document 100 may wish to update it (perhaps it had been de-aggregated in a customized way for the recipient), and an ECP server 204 can receive an old document, delete items which no longer exist, modify items which have changed, and re-sign it to provide a new document with new validity dates.

An ECP server 204 may also be adapted to provide annotation and enclosure functions. In cases of aggregation, de-aggregation and updating, a single issuer of an ECP document 100 was able to reissue or issue new ECP documents 100 based on their old ones, and on their catalog database information. In other cases, however, it will be desirable for a third party to aggregate ECP documents 100 from multiple sources for distribution for a different purpose. Multiple ECP documents 100 may be sent to a recipient for simultaneous display; however, a third-party aggregator may wish to add their own notes, reviews, price-changes, etc. to an item. Under an embodiment of a system disclosed herein, presence of digital signature 120 provides security against a third party altering an existing ECP document 100 without invalidating signature 120. However, one or more ECP documents 100 (called "source documents") can be enclosed in another compound document along with annotation sections which refer to entries within these source documents. Compound documents may be signed by a third-party aggregator or disseminator without violating integrity of enclosed source documents. In combination with other abilities of ECP servers 204, this annotation function allows third-parties to design their own catalogs based on those of other sources. For example, a manufacturer's catalog might be enclosed in this way by a reseller or OEM, or several publisher's catalogs might be enclosed by a bookseller.

It may be desirable for one or more of the above-described functions to be combined with capabilities of a conventional merchant server, including payment processing, shopping cart management, etc. Depending on the application, these functions can be viewed as being added to those of an ECP server 204, or else can be viewed as being a core set of features to which ECP server 204 functions are added.

An ECP client 202 may include an ECP parser 208 and is likely to include an ECP generator 210 as well.

Beyond parsing and verification, optionally a typical ECP client 202 may display catalog entries to a human user via a user interface 218, and may also provide, through various other applications 220 running on ECP client 202, local functions to make shopping easier, such as managing shopping lists, prices and spending limits, estimated tax and shipping costs, and so on. An ECP client 202 should also be able to perform actual ordering and payment functions where possible, according to protocols specified in ECP document 100. In addition, it may be desirable in many cases for an ECP client 202 to act as an ECP server 204 in aggregating multiple ECP documents 100 from multiple sources, and engaging in either client-side or server-side of aggregation, de-aggregation, and updating functions of an ECP server 204 described above.

ECP client 202 need not be able to perform any of these optional function; however, without parsing and verification, ECP documents 100 are not directly usable by a recipient. A recipient of an ECP document 100 can in any event forward, publish, or otherwise disseminate this document at will to other entities which do have ECP clients 202 capable of processing them properly.

Establishing an ECP document type definition and providing for an system 200 with ECP clients 202, ECP servers 204, ECP parsers 208 and ECP generators 210 provides a number of benefits and overcomes a number of problems present in the prior art. Unlike other electronic catalog formats, system 200 provides users with ability to distribute some elements that are to be included in body section 104 in space via URL links to on-line or off-line HTTP and FTP content servers. ECP documents 100 permit both links and in-line document data as desired by ECP document 100 creator.

Methods and systems disclosed herein may be used to provide interchangeable multi-source catalog entries. ECP documents 100 from different sources can be integrated, aggregated, assembled and disassembled by buyers, sellers, or third parties. This feature enables a variety of activities such as customizable personal catalogs, which without the disclosed ECP would have to be manually assembled, and without the disclosed ECP would not be verifiable as being authentically sourced from their ultimate originators.

Methods and systems disclosed herein permit establishment of catalog verification software. Methods and systems disclosed herein provide for a standard software system for a variety of catalog formats.

Methods and systems disclosed herein provide for catalog update software. Existing software programs do not provide the functions or reading and parsing already-issued catalogs and reissuing a fresh version with updated or revalidated contents.

Systems and methods disclosed herein provide for catalog annotation and enclosure. Existing on-line and off-line catalogs do not provide this feature in their formats.

Systems and methods disclosed herein provide for support of a generalized sales model. ECP supports both conventional catalog shopping and reverse catalog ordering, and can be used for one-on-one shopping, many-to-one bidding (auctions) and one-to-many purchasing (RFQ-style vendor selection) among other sales models. These different models are enabled by appropriate modifications to the interpretation of certain catalog tags such as "price" and are specified in the "SALES-MODEL" tag which appears in all ECP catalog headers. Appropriate shopping, purchasing, or bidding actions can be taken by the recipients of ECP documents 100 based on the value of the SALES-MODEL tag.

Methods and systems disclosed herein provide for a client catalog repository. Recipients of ECP catalogs can store them in a local repository (e.g. on a PC) for future reference. These catalogs can then be processed locally, aggregated, compared, etc. freely without requiring on-line connections to servers. Special purpose software for supporting such a repository is part of ECP client 202.

An electronic catalog protocol as disclosed herein facilitates changing electronic commerce between businesses and consumers. Existing channels are not replaced; rather, they are supplemented as illustratively depicted in FIG. 6, where there is shown a block diagram of an exemplary portion of an embodiment of operatively coupled systems in accordance with the present disclosure.

Figure 6:
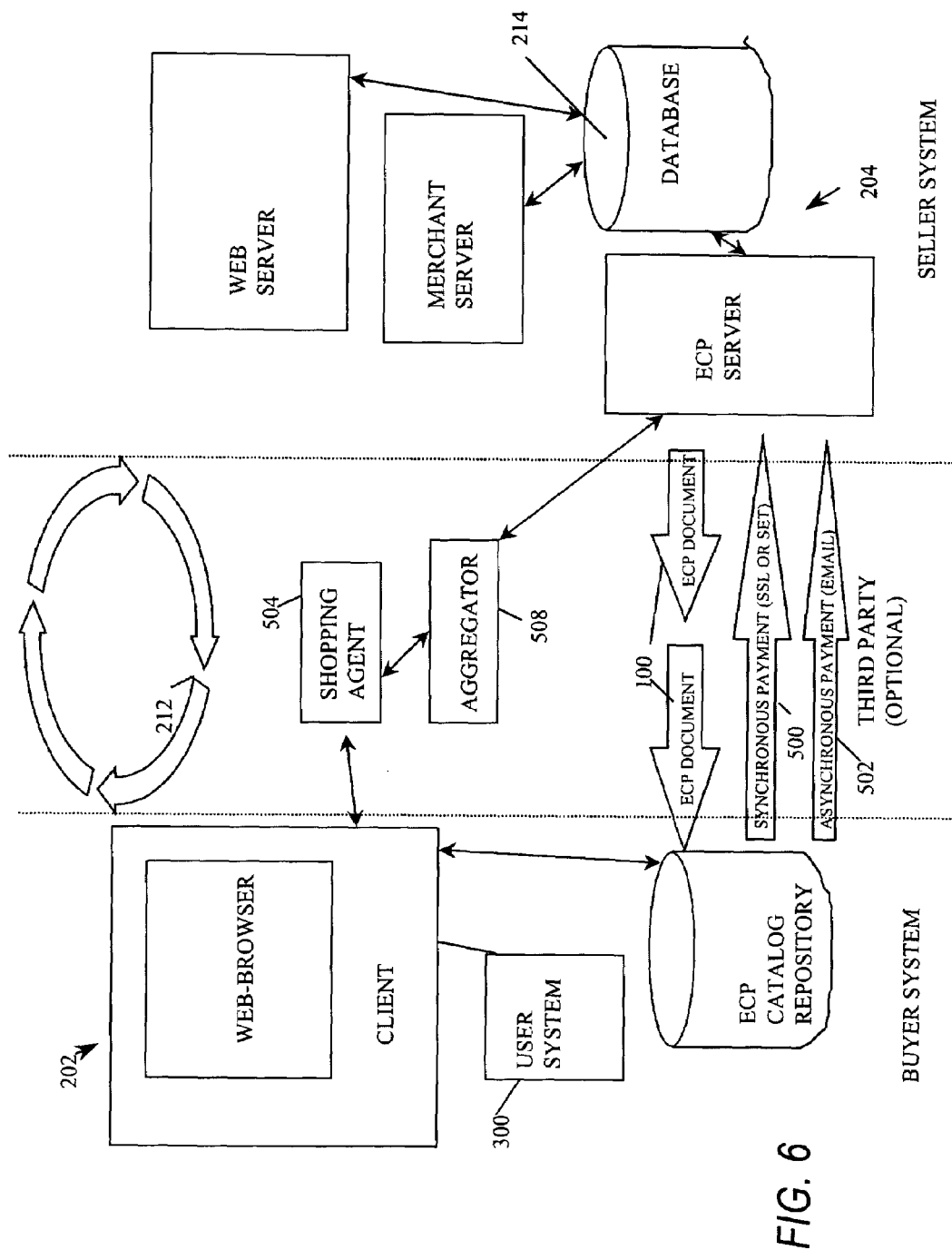
FIG. 6 depicts components for a distributed system for an embodiment of the present disclosure.

Referring to FIG. 6, ECP documents 100 are distributed throughout network 212. ECP documents 100 can be distributed either directly to customers, or indirectly through third party aggregators, resellers, comparison shopping sites, et al. Payment can be performed either through "conventional" on-line SSL or SET connections 500 to a merchant server, or off-line via encrypted email 502. Optional third party functions, appearing in the center of FIG. 6, include a shopping agent 504 and an aggregator 508.

Figure 5:
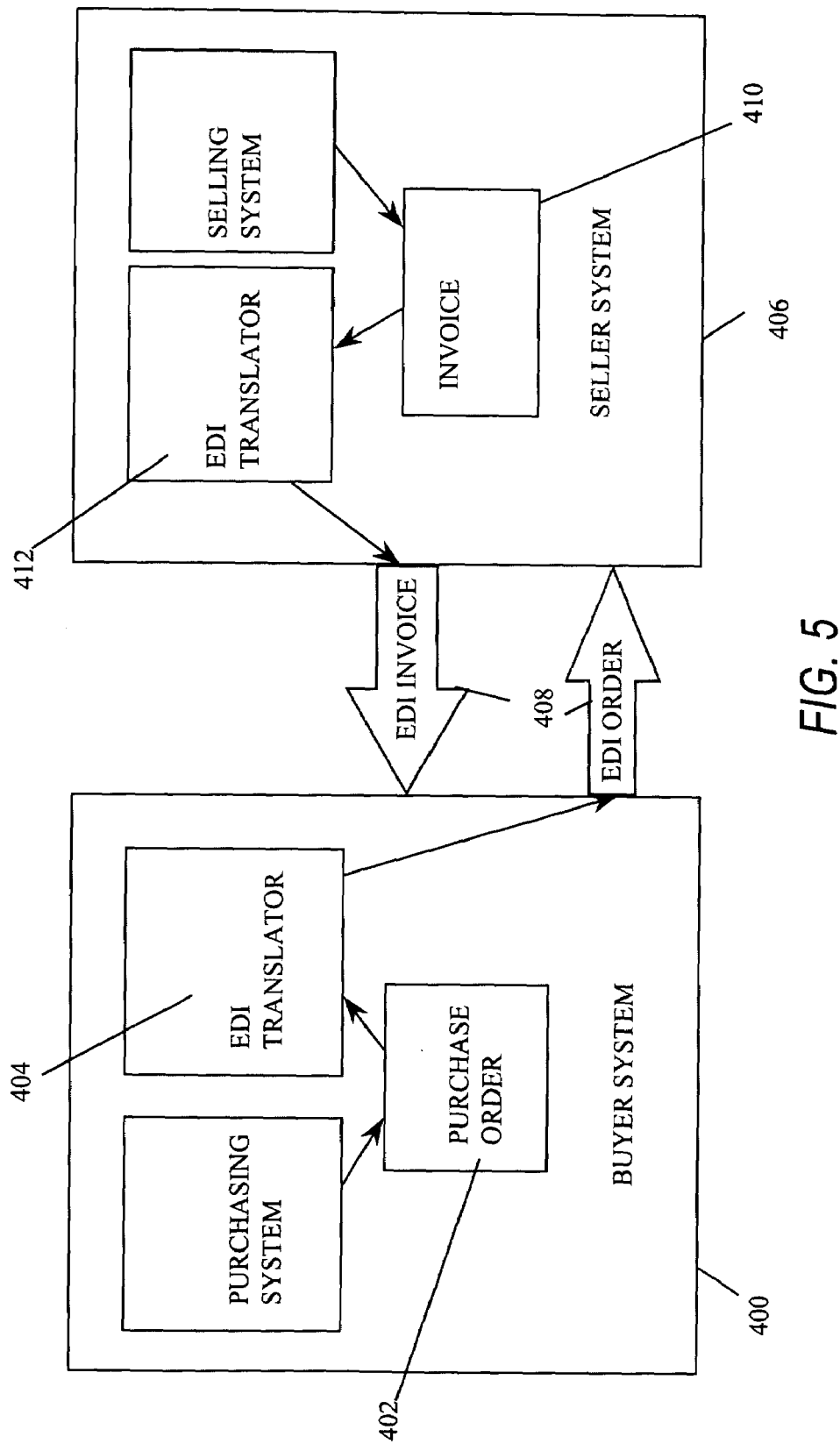
FIG. 5 depicts an embodiment of components of a system for exchanging invoices and orders in accordance with the present disclosure.
Figure 7:
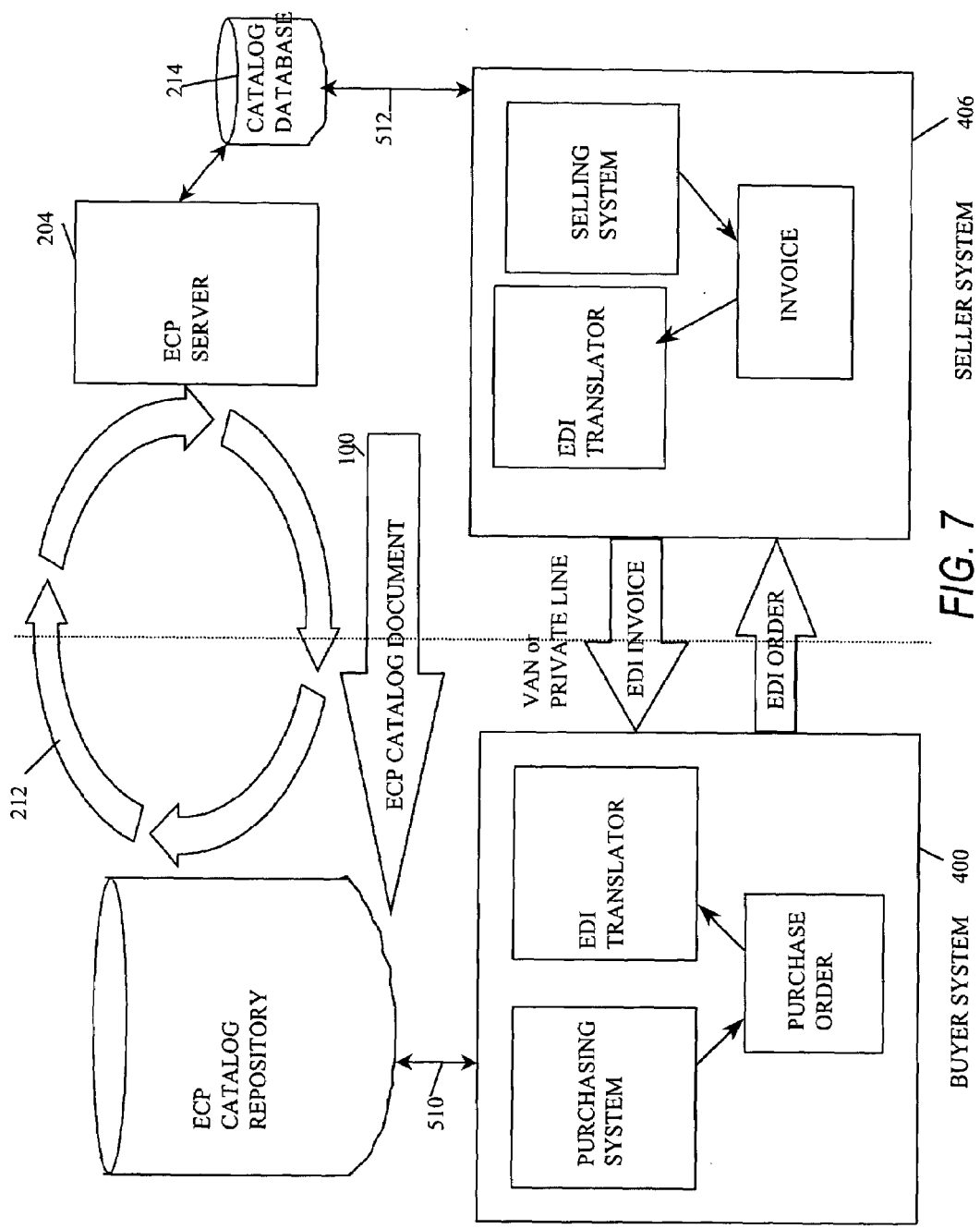
FIG. 7 depicts components of a buyer system and a seller system in accordance with an embodiment of the present disclosure.

Referring to FIG. 7, use of an ECP document 100 with electronic data interchange capability is depicted in a schematic diagram. Buyer system 400 and seller system 406 may be conventional systems such as those disclosed in connection with FIG. 5. However, a connection 510 is provided between buyer system 400 and an electronic catalog repository 514 that receives electronic catalog documents 100 through a network 212, such as the Internet, from an ECP server 204 located on a seller system. Seller system 406 includes a connection between the seller EDI system 406, similar to a conventional EDI system disclosed in connection with FIG. 5, and it includes an ECP server 204 and a database 214 for storage of electronic catalog protocol documents 100. Thus, conventional buyer systems 400 and seller systems 406 can be equipped, in accordance with the present disclosure, to use electronic catalog protocol documents. Delivery of electronic catalog protocol documents 1100 may be through the Internet or through some other network 212 download, and may be assisted by third-party intermediation.

FIG. 7 shows catalog distribution and shopping as separate from payment processing activities of EDI. Business-to-business catalog distribution may be similar or identical to that illustratively shown in the consumer example of FIG. 6, but EDI may be used to execute a purchase if a prior agreement has been reached between buyer and seller. Where such agreements have not been reached, a consumer model like that of FIG. 6 may be used for payments as an alternative to EDI.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A computer-based method, comprising:
electronically storing sourcing information for a source of an electronic catalog and at least one of ordering method information and payment method information in a header section of the electronic catalog;
electronically storing object entries in a body section of the electronic catalog, the object entries corresponding to objects available for at least one of sale by and purchase by the source of the electronic catalog;
electronically generating verification information that is usable to verify the authenticity of the header and body sections, the verification information at least partially based on the header and body sections;
storing the verification information in a footer section of the electronic catalog;
transmitting the electronic catalog to a remote location.

2. The method of claim 1, wherein at least one of the object entries includes an URL, the URL permitting a user to select the URL for presentation of multimedia content accessible through the URL.

3. The method of claim 1, wherein storing the verification information comprises:
the source of the electronic catalog digitally signing the footer section of the electronic catalog to provide a digital signature.

4. The method of claim 1, wherein the digital signature is a private key signature that corresponds to a public key.

5. The method of claim 1, further comprising:
storing validity date information in the electronic catalog;
determining whether information in the electronic catalog is current by checking that the current date is within the validity date information; and
when the current date is not within the validity date information, receiving the electronic catalog from the remote location and generating an updated electronic catalog with current information.

6. The method of claim 5, further comprising:
after updating the electronic catalog, storing updated verification information usable to verify the authenticity of updated electronic catalog, the updated verification information at least partially based on the header and body sections;
transmitting the updated electronic catalog to the remote location.

7. The method of claim 1, comprising:
provisioning a sales-model tag in the header, for specifying at least one of a purchase type and a sales type of transaction for which the electronic catalog will be used.

8. The method of claim 7, wherein the sales-model tag supports at least one of one-to-one, many-to-one and one-to-many sales models.

9. The method of claim 7, wherein the sales model tag supports all of one-to-one, many-to-one and one-to-many sales models.

10. A method comprising:
receiving a first electronic catalog, the first electronic catalog including
  first source information indicating a source of the first electronic catalog,
  at least one object entry containing first object information,
  first authenticity information indicating that the first source information and first object information is authentic, the first authenticity information at least partially based on the first source information and the first object information;
generating a second electronic catalog, the second electronic catalog including
  the first electronic catalog,
  second source information indicating a source of the second electronic catalog,
  at least one second object entry containing second object information, the second object information referring to the first object information,
  second authenticity information indicating that the second source information and second object information is authentic, the second authenticity information at least partially based on the first electronic catalog, the second source information and the second object information;
transmitting the second electronic catalog to a remote location.

11. The method of claim 10, wherein at least one of the first authenticity information and second authenticity information comprises a digital signature.

12. The method of claim 10, wherein at least one of the first source information and second source information is usable to verify the respective first authenticity information and second authenticity information.

13. The method of claim 10, wherein at least one of the first source information and second source information comprises a public key.

14. The method of claim 10, wherein the first object information includes product information, including at least one of a SKU, manufacturer, model number, product name and base unit price.

15. The method of claim 10, wherein the second object information includes annotation information referring to the first object information.

16. The method of claim 10, wherein the annotation information includes at least one of price changes, reviews and notes.

17. The method of claim 10, wherein at least one of the first object information and second object information includes a URL to a location storing additional product information.

18. A method comprising:
generating an electronic catalog, the electronic catalog including
  source information identifying a source entity of the electronic catalog, the source information including an source entity name, source entity contact data and a source entity digital certificate;
  validity information indicating a time during which the electronic catalog is valid;
  ordering method information, the ordering method information including a URL indicating a location where a transaction may be initiated;
  at least one object entry including product identification information, the product identification information including a SKU, product name, manufacturer, model number and base unit price, the at least one object entry further including a URL indicating a location where additional product information may be obtained;
  a digital signature, the digital signature based on the source information, validity information, ordering method information, and at least one object entry,
receiving a request for the electronic catalog from a remote location;
transmitting the electronic catalog to a remote location.

19. The method of claim 18, wherein generating the electronic catalog includes receiving the product identification information from a database of the source entity.

20. A machine-readable medium storing instructions executable by a processor, the instructions configured to cause the processor to perform the method of claim 18.

* * * * *